United States Patent
Menéndez Salcedo et al.

(10) Patent No.: US 8,904,789 B2
(45) Date of Patent: Dec. 9, 2014

(54) METHOD FOR GENERATING ENERGY BY MEANS OF THERMAL CYCLES WITH HIGH PRESSURE AND MODERATE TEMPERATURE STEAM

(75) Inventors: JoséMaría Menéndez Salcedo, Madrid (ES); Jerónimo Angulo Aramburu, Madrid (ES)

(73) Assignee: Sener Grupo de Ingenieria, S.A., Madrid (ES)

( * ) Notice: Subject to any disclaimer, the term of this patent is extended or adjusted under 35 U.S.C. 154(b) by 918 days.

(21) Appl. No.: 12/918,623

(22) PCT Filed: Feb. 24, 2009

(86) PCT No.: PCT/ES2009/000098
§ 371 (c)(1),
(2), (4) Date: Sep. 13, 2011

(87) PCT Pub. No.: WO2009/106657
PCT Pub. Date: Sep. 3, 2009

(65) Prior Publication Data
US 2012/0000202 A1    Jan. 5, 2012

(30) Foreign Application Priority Data
Feb. 25, 2008  (ES) .................................. 200800524

(51) Int. Cl.
| F01K 7/34 | (2006.01) |
| F01K 17/00 | (2006.01) |
| F01K 13/00 | (2006.01) |
| B60K 16/00 | (2006.01) |
| F03G 6/00 | (2006.01) |
| F01K 7/40 | (2006.01) |
| F01K 7/22 | (2006.01) |

(52) U.S. Cl.
CPC .. F01K 7/223 (2013.01); F01K 7/40 (2013.01)
USPC ................. 60/653; 60/648; 60/641.8; 60/676

(58) Field of Classification Search
USPC .......................................... 60/641.8, 645–684
See application file for complete search history.

(56) References Cited

U.S. PATENT DOCUMENTS 3,935,710 A *  2/1976  Dickinson ........................ 60/657
4,414,813 A * 11/1983  Knapp ............................. 60/655
(Continued)

FOREIGN PATENT DOCUMENTS

| ES | 2006059 | 4/1989 |
| ES | 2010890 | 12/1989 |

(Continued)

OTHER PUBLICATIONS

International Search Report dated Jun. 26, 2009 from PCT/ES2009/000098.
(Continued)

*Primary Examiner* — Christopher Jetton
*Assistant Examiner* — Steven D Shipe
(74) *Attorney, Agent, or Firm* — Katten Muchin Rosenman LLP (57) ABSTRACT

The invention relates to a method for generating energy by means of thermal cycles with high pressure and moderate temperature steam, which allows improving the energy and operational efficiency of the conversion of heat energy into mechanical or electrical energy by means of thermal cycles in which the temperature of the steam is limited to moderate values in its generation, comprising the following steps:
  a) generating steam at a pressure above 65 bar and a moderate temperature below 400° C.,
  b) expanding said steam in a steam turbine, steam of an intermediate pressure, comprised between 10-40 bar, with a moderate moisture, below 15%, being obtained
  c) drying said steam by means of a moisture separator and reheating said steam,
  d) expanding said steam in the turbine, and
  e) heating boiler water used to generate the steam by means of a plurality of steam extractions from the turbine, in order to exchange heat with said boiler water.

9 Claims, 7 Drawing Sheets

(56) References Cited

U.S. PATENT DOCUMENTS

| | | | |
|---|---|---|---|
| 4,415,335 A * | 11/1983 | Mainwaring et al. | 44/621 |
| 4,628,692 A * | 12/1986 | Pierce | 60/641.8 |
| 4,897,999 A * | 2/1990 | Varney | 60/678 |
| 5,025,630 A | 6/1991 | Marjollet et al. | |
| 5,140,818 A * | 8/1992 | Silvestri et al. | 60/678 |
| 5,346,592 A * | 9/1994 | Madani | 202/176 |
| 5,361,377 A | 11/1994 | Miller | |
| 5,724,807 A * | 3/1998 | Schuetzenduebel et al. | 60/39.464 |
| 5,784,888 A * | 7/1998 | Termuehlen | 60/677 |
| 5,793,831 A | 8/1998 | Tsiklauri et al. | |
| 6,463,738 B1 * | 10/2002 | Pinkerton et al. | 60/646 |
| 6,497,090 B2 * | 12/2002 | Bronicki et al. | 60/39.6 |
| 6,497,102 B2 * | 12/2002 | Liebig | 60/772 |
| 6,643,738 B2 * | 11/2003 | Timmer et al. | 711/128 |
| 6,742,336 B2 * | 6/2004 | Itou et al. | 60/646 |
| 7,900,431 B2 * | 3/2011 | Willson et al. | 60/39.182 |
| 8,061,139 B2 * | 11/2011 | Bronicki | 60/618 |
| 8,402,762 B2 * | 3/2013 | Deng et al. | 60/653 |
| 2004/0194467 A1 * | 10/2004 | Herzog et al. | 60/670 |
| 2006/0260314 A1 | 11/2006 | Kincaid et al. | |
| 2008/0127647 A1 * | 6/2008 | Leitner | 60/645 |
| 2009/0025387 A1 * | 1/2009 | Willson et al. | 60/653 |
| 2009/0229267 A1 * | 9/2009 | Wieghardt | 60/684 |
| 2010/0089060 A1 * | 4/2010 | Ferguson et al. | 60/653 |
| 2010/0146970 A1 * | 6/2010 | MacAdam et al. | 60/649 |
| 2011/0302921 A1 * | 12/2011 | Ferguson et al. | 60/641.8 |
| 2012/0000202 A1 * | 1/2012 | Menendez Salcedo et al. | 60/653 |

FOREIGN PATENT DOCUMENTS

| | | |
|---|---|---|
| ES | 2050846 | 6/1994 |
| ES | 2272576 | 5/2007 |
| FR | 2450363 | 9/1980 |
| RU | 1830106 | 7/1993 |
| SU | 1114804 | 9/1984 |
| WO | 9511371 | 4/1995 |
| WO | 0177500 | 10/2001 |
| WO | WO 0177500 A1 * | 10/2001 |
| WO | 2006111608 | 10/2006 |
| WO | 2007093464 | 8/2007 |
| WO | 2007093474 | 8/2007 |

OTHER PUBLICATIONS

Chinese First Office Action dated Mar. 6, 2013, from corresponding Chinese Application No. 200980114539.7.

Translation of Chinese Second Office Action dated Oct. 21, 2013, from corresponding Chinese Application No. 200980114539.7.

Mexican Office Action dated Apr. 24, 2013, from corresponding Mexican Application No. MX/a/2010/009296.

Russian Office Action dated Jan. 21, 2013, from corresponding Russian Application No. 2010139511/06 (056463).

Supplementary European Search Report dated Feb. 28, 2013, from the corresponding EP Application No. 09713851.5-1610.

* cited by examiner

METHOD FOR GENERATING ENERGY BY MEANS OF THERMAL CYCLES WITH HIGH PRESSURE AND MODERATE TEMPERATURE STEAM

TECHNICAL FIELD OF THE INVENTION

The present invention is applicable in the energy industry, and more specifically in the energy recovery of matter such as waste and biomasses, as well as in the exploitation of solar energy with concentration systems.

BACKGROUND OF THE INVENTION

Currently, the energy recovery or use of matter such as waste and biomasses, with sufficient calorific value, consists of a cycle which is generally carried out in a combustion furnace, the hot exhaust gases of which are used in a boiler to generate pressurized superheated steam, for its subsequent expansion in a condensation turbine which is usually coupled to an electric generator.

This process is based on a Rankine cycle and its energy efficiency is determined by the quality of the steam, such that said efficiency improves as superheated steam is generated at the highest possible pressure and temperature.

However, in the boilers of currently existing furnaces for the combustion of waste and some biomasses, particularly in the case of boilers for urban solid waste or assimilable materials, the maximum temperature which can be reached in the steam is limited as a consequence of the fact that above temperatures in the order of 350° C., the superheating tube bundle for the steam experiences excessive corrosion, caused by the exhaust gases of the combustion of the waste and of the biomasses.

The presence of hydrogen chloride from the combustion of products containing chlorine stands out among the factors causing said corrosive effects in the case of urban solid or assimilable waste. Additionally, in plants using forest or agricultural waste, such as cereal straw, olive grove waste, etc., it is necessary to consider the corrosive effects due to the potassium content present in the waste, which is entrained by the fly ash, being deposited in the superheaters, whereby it ends up melting, increasing the difficulty involved in its elimination, while at the same time it favors the corrosion since this molten fly ash becomes detached.

Currently existing conventional systems consist of generating steam at pressures of about 40 bar, superheating at temperatures of about 400° C. in the waste boiler, such that the rate of corrosion in the exterior of the tube bundles is several times greater than that which occurs in those cases in which the temperature of the steam is below 350° C.

For the purpose of overcoming the problems of corrosion of the superheating tube bundles set forth above, methods have been developed in which steam is produced in a waste incineration boiler, of a high pressure, above 70 bar and usually with values of about 100 bar, which is slightly overheated or not overheated, i.e., at temperatures in the order of 330° C., in which the corrosive effects are not very significant.

To increase the efficiency of the steam turbine, in the plants which use these methods, the high pressure and moderate temperature steam generated is superheated in the exterior of the waste boiler. To that end, exhaust gases from the combustion of a clean fuel, such as natural gas for example, which does not cause corrosion, is used.

Steam of a high pressure, in the order of 70-110 bar, and a high temperature, in the order of 500-540° C., is thus obtained, without corrosion occurring in the waste furnace, which allows generating energy in the turbine with high energy efficiency, said energy being able to be mechanical or electrical energy, in the latter case when the steam turbine is coupled to an electric generator.

Methods such as those of this type are described in Spanish patent numbers ES-2006059-A6 and ES-2010890-A6, which describe methods in which the high pressure steam generated in a boiler for urban solid waste or assimilable materials, at temperatures below the temperature at which the effects of the corrosion start to be significant, is superheated in a boiler for recovering the heat of the combustion gases of a clean fuel or the exhaust gases of a gas turbine. With these systems, not only are the effects of the corrosion avoided, but the production of electrical energy is increased, with a high energy efficiency in the use of both fuels.

Likewise, U.S. Pat. No. 5,724,807-A also describes a method for superheating steam at pressures above 68 bar, generated in a waste boiler, using the exhaust gases of a gas turbine, which furthermore generate a low pressure steam which is used for services such as cooling the air of the gas turbine or preheating the combustion air of the waste furnace and the condensates.

However, the effective industrial application of the methods set forth above has not been very successful, therefore conventional installations working with steam at a pressure below 60 bar and temperatures above 350° C. are still usual today, which is due to the difficulties involved in having a clean and cost-effective auxiliary fuel in the proximity of an incineration plant, and due to the fact that the improvement of the energy efficiency entailed by these methods does not economically compensate the need to make a higher investment and the extra cost of the auxiliary fuel, being non-viable or inefficient methods from the point of view of the economic efficiency thereof.

On the other hand, one of the most widespread methods for the exploitation of solar energy consists of concentrating direct solar irradiation, by means of using mirrors, on a receptor through the inside of which there circulates an intermediate heat transfer fluid which serves to store and transport heat from the steam generation boilers. This method is used in thermal power stations in which the maximum temperature level which the intermediate organic fluids can withstand without their decomposition occurring is in the order of 400° C.

As a consequence of this technical limitation, the boilers of solar concentration installations with an intermediate heat transfer fluid are designed to generate steam at temperatures in the order of 380° C., which means that the thermal cycles taking place in these solar installations have a low energy efficiency.

For the purpose of improving the energy efficiency of thermal cycles based on the exploitation of solar energy several methods have been considered, including French patent number FR-2450363-B1, which describes a thermal power station for producing electricity from solar energy by means of superheating steam at a pressure of 50 bar, generated with an intermediate organic fluid from solar collectors, by means of a mixture of molten salts heated at a high temperature in a solar collector with a central tower and heliostats.

Likewise, United States patent application number US-2006260314-A1 describes a method and a system in which low temperature steam, generated with intermediate organic fluids from solar collectors, is superheated with high temperature steam from a combined cycle, which can also be performed with the tail exhaust gases of a combined cycle, as described in international PCT patent application number WO-9511371-A1.

On the other hand, international PCT patent application numbers WO-2007093464-A1 and WO-2007093474-A1 describe the use of an external heat supply in a Rankine cycle, for which a turbine with intermediate reheating and expansion by means of a non-renewable fuel is used.

However, in practice all these installations and methods for improving the efficiency of the generation of thermosolar electrical energy have an expensive and difficult industrial application since they require the participation of complex systems, such as the association with combined cycles, the use of non-renewable fuels and the use of molten salts at a high temperature, for example.

In short, the analysis of the state of the art shows that simpler and more efficient thermal cycles are required for the generation of electrical energy with moderate temperature steam, both in waste or biomass boilers, for the purpose of preventing the effects of corrosion, and in thermosolar power stations, for preventing the decomposition of organic heat transfer fluids, without needing to resort to using auxiliary fuels.

Likewise, more efficient thermal cycles are also required which superheat the high pressure and moderate temperature steam, generated in waste or biomass boilers, by means of using auxiliary fuels, such that the energy efficiency gain compensates the costs derived from the fact of having to make a larger investment and the costs corresponding to the consumption of the auxiliary fuel.

DESCRIPTION OF THE INVENTION

The present invention relates to a method for generating energy by means of thermal cycles with high pressure and moderate temperature steam, which allows improving the energy and operational efficiency of the conversion of heat energy, from renewable heat sources or fuels, into mechanical or electrical energy by means of thermal cycles with high pressure steam, the temperature of which is limited to moderate values in its generation.

The object of the present invention is to increase the energy efficiency of Rankine cycles in which the temperature of the steam is limited to moderate values, not greater than values in the order of 380° C., due to reasons of corrosion in steam boilers or as a consequence of the decomposition of heat transmission fluids, as has been set forth above.

Obviously, the invention is also applicable to any method for generating energy in which the temperature of the steam is limited by any technical or economic reason other than those set forth in the previous paragraph.

The invention comprises several objectives which are described below.

A first objective of the present invention is to achieve a thermal cycle which uses high pressure and moderate temperature steam, without the participation of auxiliary or additional fuels for superheating said steam, and which at the same time has a better energy and operational efficiency than those offered by the methods used today.

Likewise, an objective of the invention is to achieve higher operational efficiency in combustion furnaces for waste, biomasses or materials assimilable thereto, decreasing the corrosion in the steam tubes thereof, the consequence of which is the reduction of the downtimes of the installation for performing maintenance operations, with the associated costs that this entails, allowing the increase of the annual tonnage of waste incinerated in an installation using the method of the invention, as well as an increase of the electrical energy generated.

In direct relation to the objective set forth in the previous paragraph, the invention contemplates a method for the internal cleaning of the boilers by means of soot blowers, which contributes to reducing the operational costs of the installation and improving the operational capacity of the thermal cycles which operate with high pressure and low temperature steam, which in short means reducing the downtimes of the installation and, therefore, increasing the efficiency.

Another objective of the present invention relates to achieving an increase of the energy and operational efficiency of thermal cycles which use high pressure and moderate temperature steam when the steam thus generated is superheated in the exterior of the boiler, using to that end an auxiliary fuel or any other additional heat supply.

According to the invention, the method for generating energy by means of thermal cycles with high pressure and moderate temperature steam comprises the following steps:

a) generating steam at a pressure above 65 bar and a moderate temperature below 400° C.

b) expanding the steam generated in step a) in at least one two-body steam turbine comprising a high pressure body and a low pressure body, steam of an intermediate pressure, comprised between 10-40 bar and preferably between 15-30 bar, with a moderate moisture, below 15% and preferably below 5%, being obtained in said high pressure body of the steam turbine.

c) drying the steam obtained in step b) by means of at least a moisture separator and then reheating said steam.

d) expanding the steam obtained in step c) in the low pressure body of the steam turbine.

e) heating boiler water used to generate the steam in step a) by means of using a plurality of steam extractions from the turbine, preferably not less than 4 extractions, in order to exchange heat with said boiler water and achieve the heating thereof.

A thermal cycle of steam, usually of water, of a high pressure, with intermediate expansion to highly regenerative wet steam is thus achieved, improving the energy efficiency which can be achieved with steam of a moderate temperature, preferably about 330-380° C.

In step b) the expansion of the high pressure steam is performed in a two-body turbine, obtaining in the exhaust of the high pressure body an intermediate pressure steam, at a temperature which can be less than the saturation temperature, wet steam being obtained.

In step c), the liquid water is removed from the intermediate pressure wet steam, for which a moisture separator can be used, the dry steam then being reheated at moderate temperatures.

In step e), the use of a large number of extractions from the turbine allows preheating the boiler feedwater or providing for other heat needs of the cycle, such as a preheating of the combustion air, for example.

Figure 1:
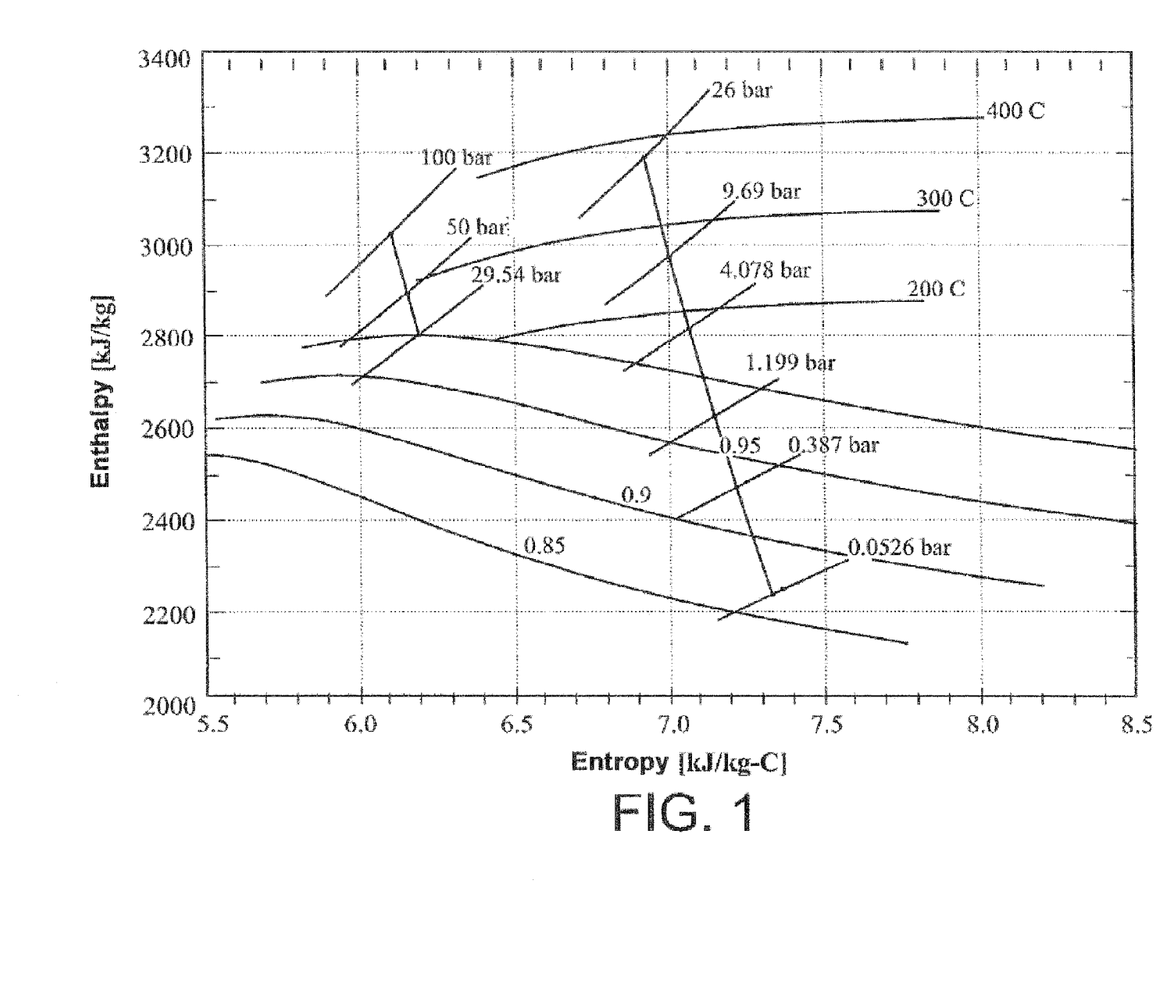
FIG. 1 shows a Mollier diagram for a thermal cycle of saturated steam.

A singularity of the method of the invention is the intermediate expansion of the steam to the wet area and its subsequent drying before it is reheated, which is explained in view of the Mollier diagram depicted in FIG. 1, in which it can be seen that the expansion of the high pressure steam is limited by the proximity of the temperature curve of the high pressure steam, slightly superheated, and that of the medium pressure saturated steam. The expansion is improved when the temperature difference between the high pressure steam and the medium pressure steam increases, taking the expansion to temperatures below the saturation temperature, as can be seen in the Mollier diagram depicted in FIG. 2.

The subsequent separation of the water reduces the thermal impact in the steam reheater since the re-evaporation of said water is prevented. The separation of the water from the expanded wet steam can be performed in a simple manner by intercalating a moisture separator in the steam line located between the outlet of the intermediate pressure steam of the turbine and its inlet to the reheating tube bundle.

To separate the water, droplet separators can be used, such as a pressurized cylindrical container with internal deflectors made of stainless steel, which allow reducing the moisture in a virtually complete manner and have a pressure drop below 50 mbar.

The differences of the method of the invention compared to the methods used today can be seen, for example, when the method of the invention is applied in the combustion of urban solid waste. The features which constitute said differences are set forth below.

In the method of the invention, the generation of steam in the incineration boiler is performed at 90-110 bar and temperatures in the order of 315-350° C., whereas in the methods of the state of the art the generation of steam is performed at pressures of 30-60 bar and temperatures of 375-450° C.

In the method of the invention, a two-body turbine is used, in the first body of which the steam of a high pressure, 90-110 bar, superheated at a temperature of about 330° C., is expanded to an intermediate pressure, 10-30 bar, with a temperature similar to or below the saturation temperature, therefore containing moisture, preferably not more than 5%; the water then being separated by means of a moisture separator and reheated in the furnace, with the exhaust gases of the combustion, at a temperature of about 330° C., thus obtaining a superheated medium pressure steam which is expanded in the low pressure body of the turbine. In contrast, the methods used today use a turbine with a single medium pressure and relatively high temperature body, without intermediate reheating, which entails an external corrosion in the tubes of the boiler that is much greater than that which is achieved with the solution object of this invention.

The method of the invention uses a highly regenerative cycle in which a large number of steam extractions from the turbine, preferably from 5 to 6 extractions, is used to heat the boiler water before and after the deaeration and to superheat the combustion air, previously heated in parallel with the boiler feedwater. In contrast, the cycles of the state of the art are less regenerative, generally with three steam extractions from the turbine and preheating the combustion air directly with steam from one of those extractions.

Having identified the differences, the advantages of the method of the invention compared to a prior less regenerative low pressure and high temperature cycle are set forth below, including the fact that the method of the invention has a higher energy efficiency and that the corrosion in the tube bundles of the superheater and reheater of the high pressure steam is not significant, which reduces the costs and the time required by the plant maintenance shutdowns. Thus, the availability of the installed electric power, i.e., the number of operating hours per year at the rated power, increases; as does the tons of waste incinerated per year.

These advantages are observed in Table 1, which refers to a comparison between a method for electric generation from urban solid waste (USW) incinerating 30 t/h with a calorific value below 2,000 kcal/kg.

TABLE 1

| Method | State of the art | Present invention |
|---|---|---|
| Steam pressure (bar) | 40 | 92 |
| Steam temperature (° C.) | 400 | 330 |
| Turbine | Simple, without intermediate reheating | Two bodies, with intermediate reheating |
| Number of steam extractions from the turbine | 3 | 5 |
| Annual energy generated (GWhe) | 137.357 | 164.228 |

The improvement of the energy efficiency allows increasing the electrical energy generated per operating hour, whereas the decrease of the corrosion involves an increase of the operating hours. The effect of both factors is an increase of the electric production by 19.56%.

Figure 2:
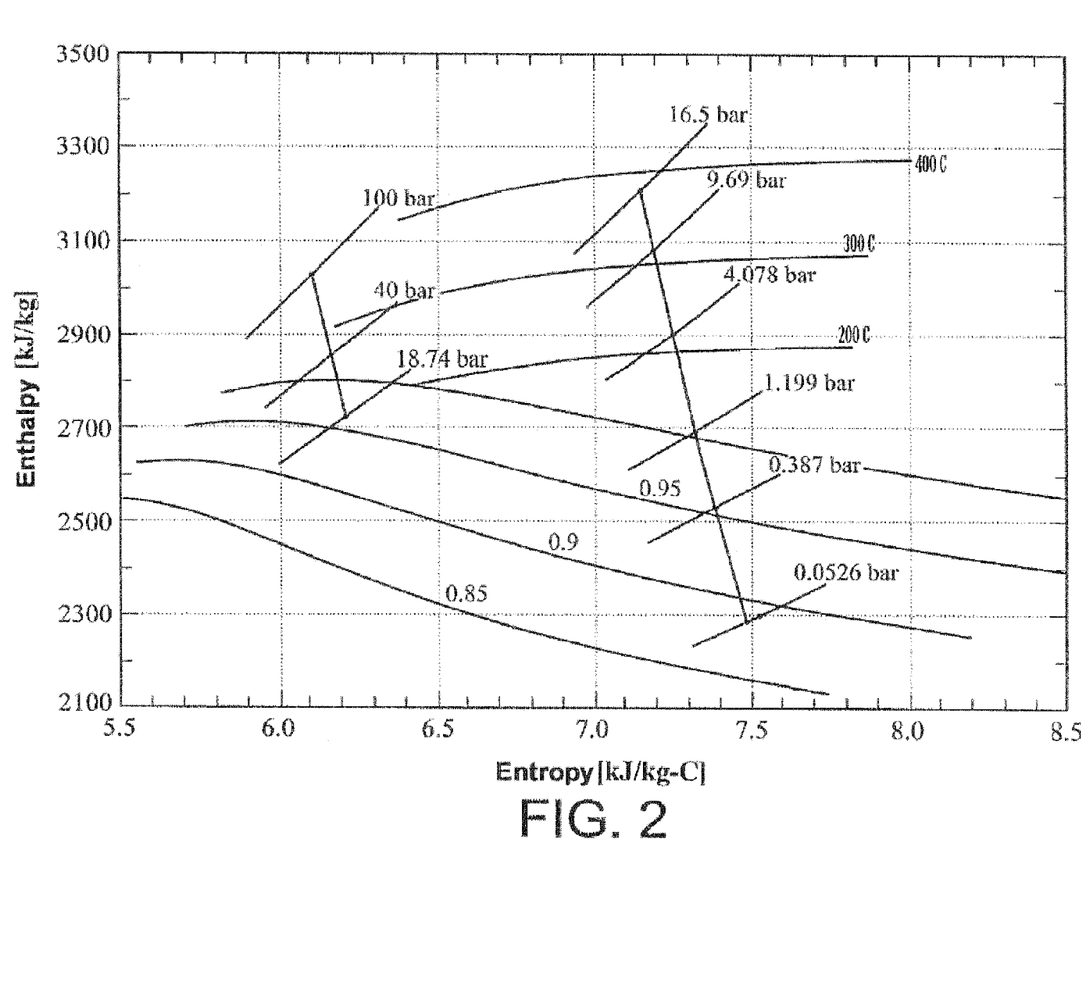
FIG. 2 shows a Mollier diagram for a thermal cycle of wet steam.
Figure 3:
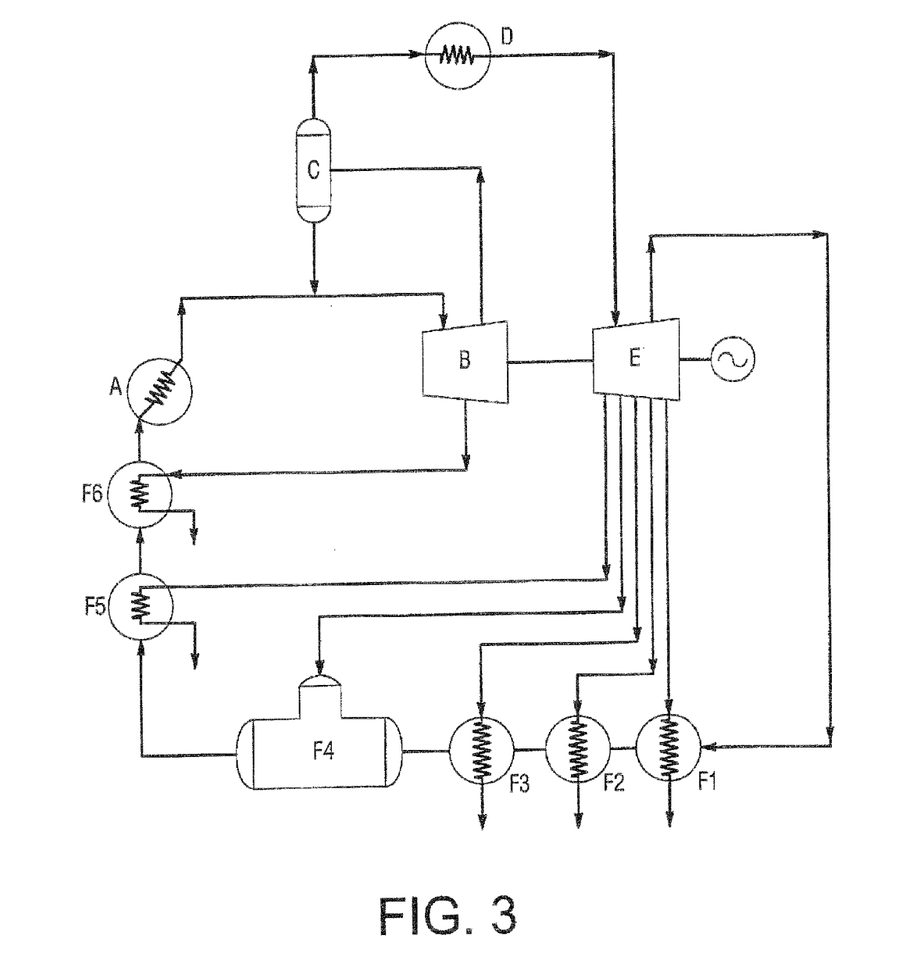
FIG. 3 shows a schematic diagram of the method for generating energy proposed by the invention.

The improvement of the energy efficiency of the expansion of high pressure steam to an intermediate pressure wet steam, as depicted in the diagram of FIG. 2, with the separation of the moisture before the reheating is shown below in Table 2 for a case of exploitation of solar energy, by means of a cycle of steam of a high pressure, 100 bar, and a moderate temperature, 377° C., with a two-body turbine, forming part of a very regenerative cycle with 6 lateral steam extractions from the turbine to preheat the boiler water.

TABLE 2

| | SATURATED STEAM EXPANSION. FIG. 1 | WET STEAM EXPANSION. FIG. 2 |
|---|---|---|
| Steam generated in boiler | | |
| Temperature (° C.) | 377 | 377 |
| Pressure (bar) | 100 | 100 |
| Steam at the outlet of the high pressure body of the turbine | | |
| Temperature (° C.) | 231 | 207 |
| Pressure (bar) | 28 | 18 |
| Moisture | — | 5% |
| Steam reheated to the first low pressure body | | |
| Temperature (° C.) | 380 | 380 |
| Pressure (bar) | 26 | 17 |
| Efficiency of the cycle of steam | 39.06% | 39.40% |

The effect of the expansion of the wet steam and its subsequent drying, before the reheating, represents a heat energy saving of the intermediate heat transfer fluid in the order of 1%, which is equivalent to a surface of solar collectors which is 2% lower.

The possibility of using at least one pump for impelling the boiler feedwater in step e), said pump being coupled to a shaft of the steam turbine, is contemplated.

In the cycles of the state of the art, the boiler water feed pump has to impel said water from pressures slightly above atmospheric pressure to pressures in the order of 50 bar, therefore said pump is normally operated by an electric motor. However, in processes using high pressure steam, the boiler feedwater pump has to pump to pressure levels in the order of 100 bar, which involves the higher electric consumption of the installation itself.

To reduce this energy consumption, in the cycles of the present invention, the boiler feedwater pump is directly coupled to the shaft of the steam turbine, whereby an energy saving is achieved which can represent 8-10% of the energy consumed by the pump, since losses in the energy generator coupled to the steam turbine, losses in the transformation of the mechanical energy of the shaft of the turbine into electrical energy in the generator terminals, losses in the voltage transformers and the electrical conduction circuits as well as losses in the transformation of electrical energy into mechanical energy in the motor of the pump are prevented.

On the other hand, the direct coupling to the shaft of the steam turbine entails a decrease of the electrical energy self-consumption, which allows generating more net electrical energy when the gross power of the generator is limited by legal restrictions. When this situation occurs, both effects, the energy saving and the decrease of the electrical self-consumption can mean, in the case of direct coupling, an increase in the order of 1% in the energy poured into the network, with respect to the use of a motor in conventional technology.

According to an embodiment of the invention, the generation of steam in step a) and the reheating of dry steam in step c) comprises using heat obtainable a from combustion gases of matter selected from waste, biomasses, assimilable materials and a mixture thereof.

Likewise, it is contemplated that step c) comprises using air in the combustion of the matter selected from waste, biomasses, assimilable materials and a mixture thereof, wherein said air is preheated by means of boiler feedwater and water extracted from said at least one moisture separator used in said step c).

According to a preferred embodiment of the variant set forth in the previous paragraphs, the combustion of matter selected from waste, biomasses, assimilable materials and a mixture thereof is performed in at least one furnace in the cleaning of which superheated steam is used, obtained by means of the following steps:

f) taking part of the steam generated in step a) and reducing its pressure, by means of using at least one reducing valve, to a sufficient pressure level for overcoming pressure drops of a system comprising a plurality of soot blowers, and g) heating the steam obtained in step f) in at least one heat exchanger, in which a heating fluid is part of the steam generated in step a), superheated steam configured to operate the soot blowers being obtained.

Conventional soot blowers normally use steam at 5-25 bar which is superheated at temperatures preventing moistures which can cause corrosions. The availability of high pressure steam in these cycles allows using a simple and original means for generating the soot blowing steam, especially at the starts, when no other type of steam is available.

According to the present invention, to obtain the steam with the precise characteristics for blowing soot, the starting point is saturated or slightly superheated steam taken at the outlet of the waste boiler or incinerating furnace; its pressure is reduced with a reducing valve to a value slightly above the desired value for blowing soot, normally 20-25 bar in plants for urban and assimilable waste, in order to take into account the pressure drops between the valve and the blowers. The wet steam thus obtained is superheated at the desired temperature in a heat exchanger in which the heating fluid is the same saturated or slightly superheated high pressure steam generated by the incinerating furnace, and likewise taken from the outlet manifold of that furnace. The excess wet steam of the heat exchanger is discharged to an expansion tank of the continuous purge of the incinerating furnace, or to the drainage or to any point of the plant which can receive said steam and exploit its energy.

Figure 7:
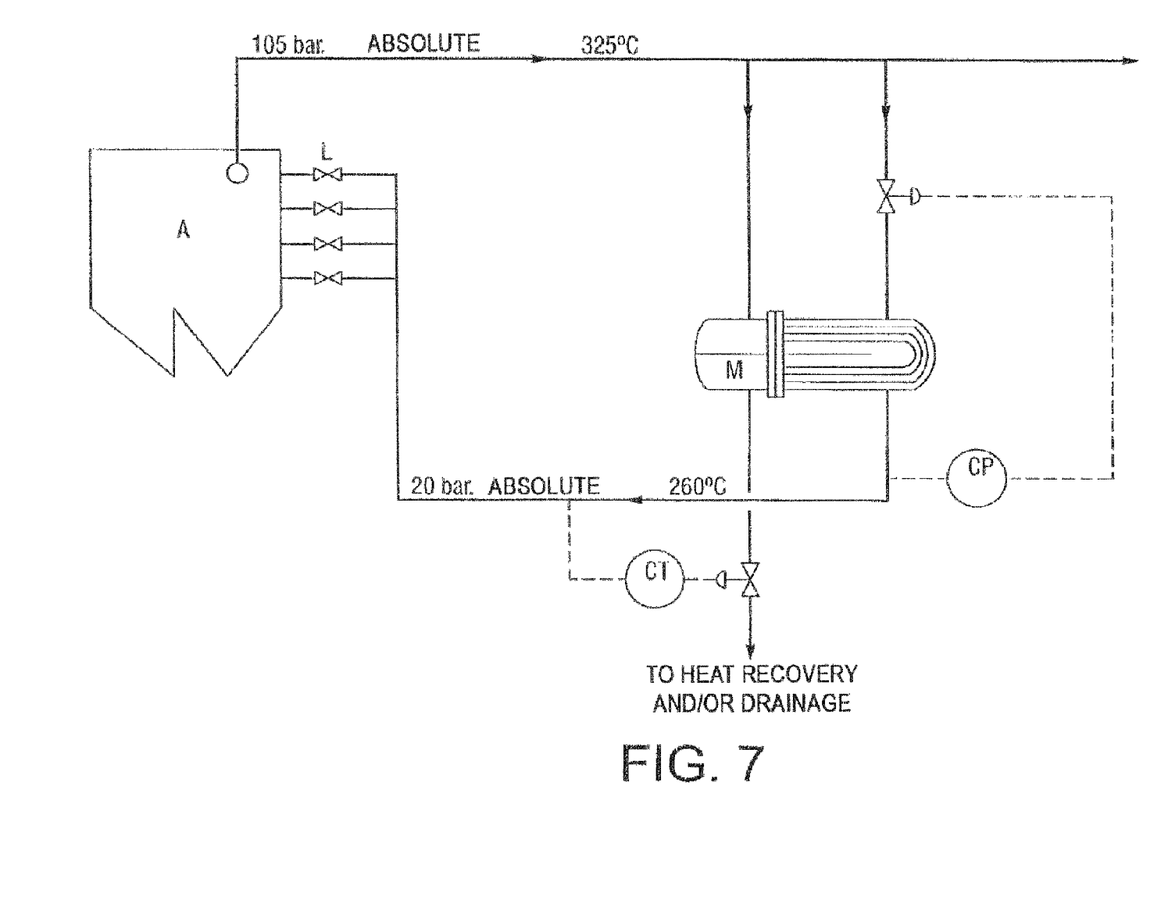
FIG. 7 shows a diagram of the system of soot blowers proposed by the invention.

FIG. 7 shows a diagram of the proposed system, in which the soot blowers work at 20 bar absolute and a temperature of 260° C., and the characteristics of the steam generated in the incinerating furnace are 105 bar absolute and 325° C.

Thus, with the invention, having to provide auxiliary boilers of non-renewable fuel, such as fuel oil or natural gas for example, or electric boilers, for generating steam with those characteristics or superheating steam generated at high pressure and saturated or slightly reheated after reducing its pressure, and therefore with moisture, is avoided. Any of these solutions is expensive to install and operate taking into account that the annual use time of the blowers is in the order of 2-3%.

On the other hand, in another variant of the invention the possibility that the generation of steam in step a) and the reheating of dry steam in step c) comprises using heat of a solar origin is contemplated.

According to a preferred embodiment of the variant described in the previous paragraph, the generation of steam in step a) and the reheating of dry steam in step c) comprises using heat of a solar origin and heat obtained from the combustion of matter selected from biogas, natural gas, synthesis gas, petroleum-derived fuels, waste, biomasses, assimilable materials and a mixture thereof.

In any case, the possibility is contemplated that the method additionally comprises the following steps:

h) superheating the steam generated in step a) by means of using heat from the combustion of an auxiliary fuel to a high temperature comprised between 500-580° C., prior to step b), and i) performing the reheating of step c) by means of reheating the steam obtained in step b) by means of heat from the combustion of said auxiliary fuel at a high temperature comprised between 500-580° C.

In the methods of the state of the art, with steam boilers working with fuels which do not cause corrosion in the tube bundles, superheated steam is generated at temperatures of 530-540° C., since this range is usually that of the maximum temperature allowed by the use of materials having a reasonable cost for the construction of the superheaters/reheaters, as appropriate, of the boiler.

In the case of boilers which recover the heat from the exhaust gases or urban waste or the like, in which steam at high pressure and low temperature is generated, to prevent the corrosion of the tube bundles, the steam temperatures of 530-540° C. are achieved by heating the steam generated in the waste boiler by means of using another external boiler working with non-corrosive exhaust gas, as has been described in the background of the present specification.

In contrast, in the method proposed in the present invention, the heating in the external boiler with additional fuels or auxiliary heat is performed such that the steam is superheated or reheated, as appropriate, above 540° C., to the limit allowed by the materials of modern steam turbines, which is usually in the order of 565-580° C. The energy efficiency is thus improved by an additional 2-3%.

According to a preferred embodiment of the method described in the previous paragraph, the auxiliary fuel is matter selected from biomass, biogas, natural gas, synthesis gas, waste, waste processing rejects, petroleum-derived fuels, assimilable materials and a mixture thereof. Likewise, step e) preferably comprises using heat from the combustion of the auxiliary fuel to preheat the boiler water.

DESCRIPTION OF THE DRAWINGS

To complement the description which is being made and for the purpose of aiding to better understand the features of the invention according to a preferred practical embodiment thereof, a set of drawings is attached as an integral part of said description, in which the following has been depicted with an illustrative and non-limiting manner.

PREFERRED EMBODIMENT OF THE INVENTION

As has been set forth, the invention comprises combinations of several inventive elements which have synergistic effects on the improvement of the energy efficiency and on the availability of different installations. Three embodiments are described below, without these examples being a limitation to the possibilities of combination and application of the inventive concepts described above FIG. 4 shows a thermal cycle of high pressure and moderate temperature steam without reheating in the exterior of the waste boiler for the thermal recovery of biomasses or solid waste or materials assimilable thereto.

Figure 4:
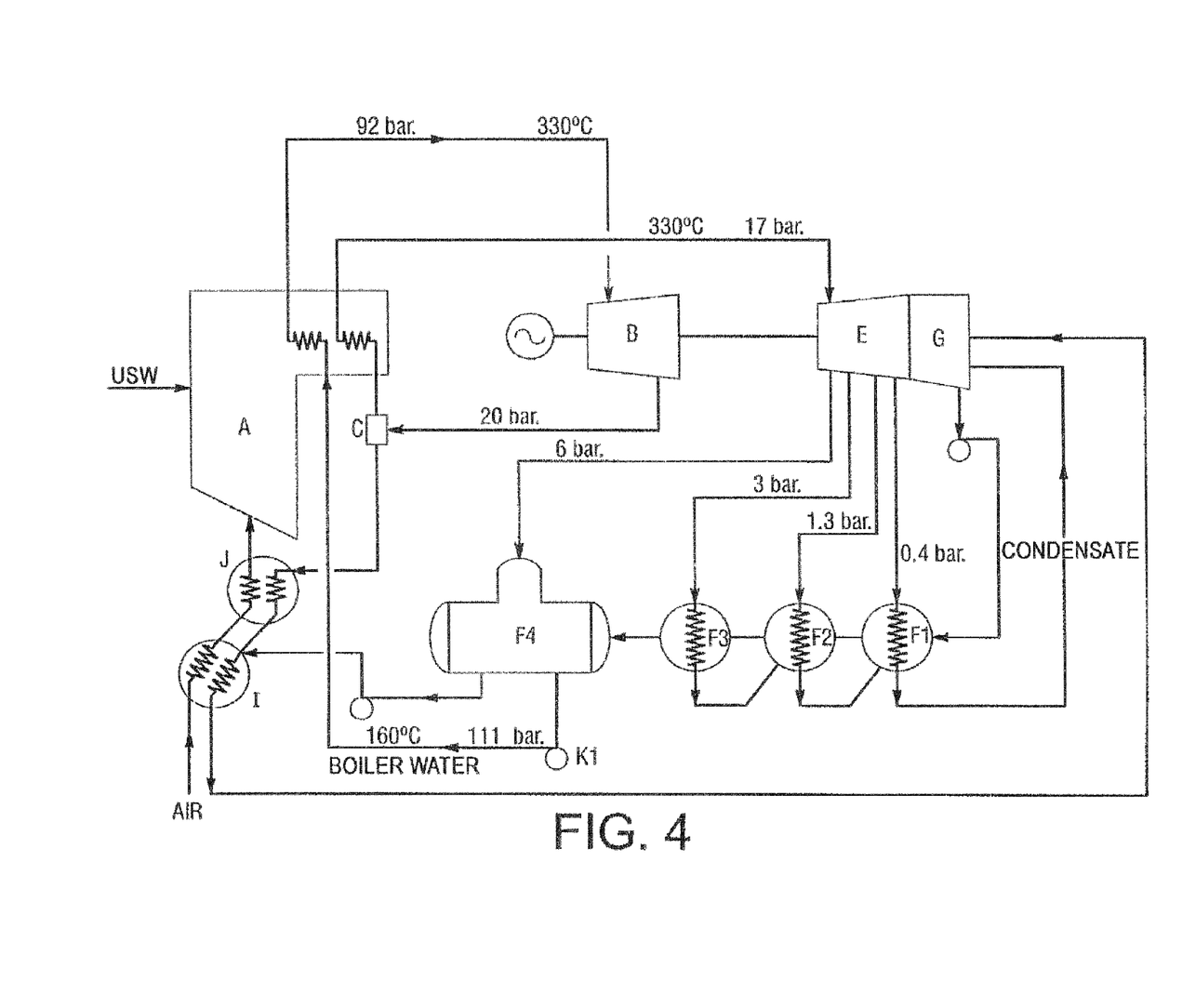
FIG. 4 shows a schematic diagram of the method of the invention for a thermal cycle of high pressure and moderate temperature steam without reheating in the exterior of the waste boiler.

The cycle depicted in said FIG. 4 is a preferred embodiment of the invention for electric generation by means of a combustion boiler for urban solid waste or a product assimilable thereto, which generates high pressure and low temperature steam. This preferred embodiment, in addition to the steam turbine with intermediate reheating and the multiple extractions from the turbine, as well as the preheating of the air with preheated boiler feedwater, incorporates the coupling of the boiler feedwater pump to the shaft of the turbine and the blowing of the soot, which are not indicated in the diagram of FIG. 2 in order to not complicate its understanding.

In view of said FIG. 4, the boiler (A) for urban solid waste generates steam at 92 bar and 330° C., which is expanded in the first body (B) of the steam turbine at 20 bar and about 212° C. The expansion is performed to a pressure of 20 bar and a temperature below the saturation temperature, such that the expanded steam contains 5% moisture.

The steam is then led to a droplet separator (C), from which a condensate, which is sent to the combustion air heater (J), and an intermediate pressure dry steam are collected. This steam is reheated again in the boiler (A) at 330° C. to be expanded in the low pressure body (E) of the steam turbine. Several steam currents are extracted from the low pressure body (E) of the turbine, which steam currents preheat the condensate obtained in the condenser (G) in three water heaters (F1, F2, F3) and in a deaerator (F4) or degasifying tank, whereas an expanded steam current or the water condensed in the exhaust of the high pressure body (B) of the turbine serves to heat the combustion air in an exchanger (J). From the deaerator (F4), a high pressure pump (K1) sends the boiler water at about 160° C. to the boiler (A). Part of the water of the deaerator (F4) is also used to preheat the combustion air in an exchanger (I).

This embodiment allows achieving increases of up to 20% in the generation of net energy poured into the network, with respect to a conventional high temperature and low pressure cycle, due to the combined effect of the higher power generated by the new cycle, and to a lesser extent, due to the greater use of the plant. An inspection of the tubes for the generation of steam and the reheating of the dry expanded steam, carried out after 24000 hours of work, does not show evidence of corrosion.

Figure 5:
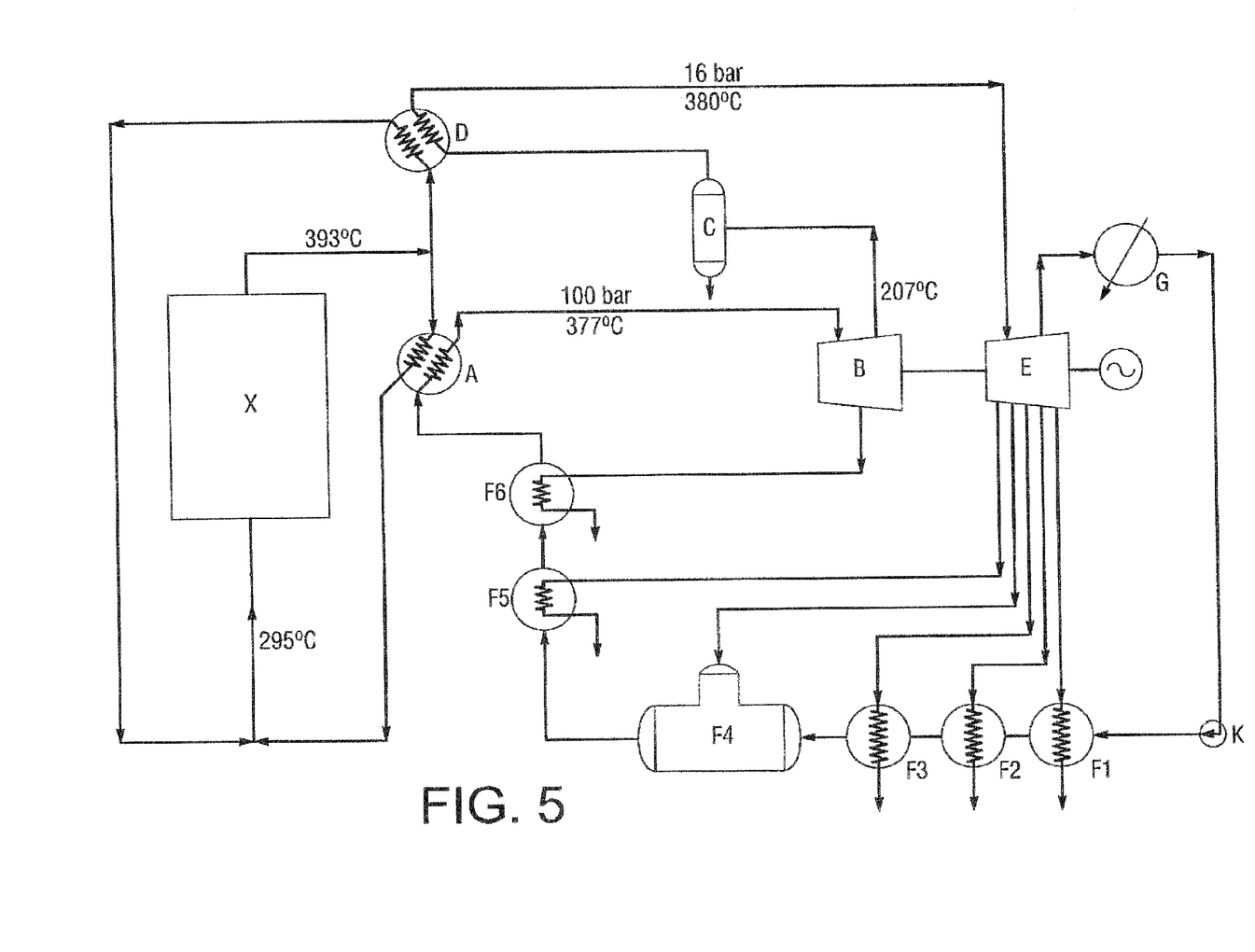
FIG. 5 shows a schematic diagram of the method of the invention for a thermal cycle of high pressure and low temperature steam, without using auxiliary fuel, for the recovery of solar energy.

On the other hand, according to a second embodiment, depicted in FIG. 5 there is a thermal cycle of high pressure and low temperature steam, without using an auxiliary fuel, for the recovery of solar energy. Said FIG. 5 shows a preferred embodiment for the exploitation of solar energy with an array of direct radiation collectors (X), which concentrate the heat on an organic heat transfer fluid which releases the solar heat in the boiler (A) in which high pressure steam is generated and to a reheater (D) of the outlet intermediate pressure steam of the high pressure body of the steam turbine (B).

The boiler water is pumped at more than 100 bar through the exchangers (F1, F2, F3), in which it is preheated with lateral steam extractions from the turbine, it is deaerated in the deaerator (F4) and undergoes a new preheating in two exchangers (F5, F6) with other lateral extractions from the turbine. The vaporization of the water occurs in the boiler (A), with the heat of the heat transfer fluid, steam being generated at about 100 bar and 377° C., which steam is expanded in the high pressure body of the steam turbine.

The medium pressure wet steam is dried in the droplet separator (C) and reheated at 380° C. in the exchanger (D), using solar heat of the heat transfer fluid. The medium pressure steam at 16 bar and 380° C. is expanded in the low pressure body of the steam turbine (E) and condensed in the condenser (G).

Figure 6:
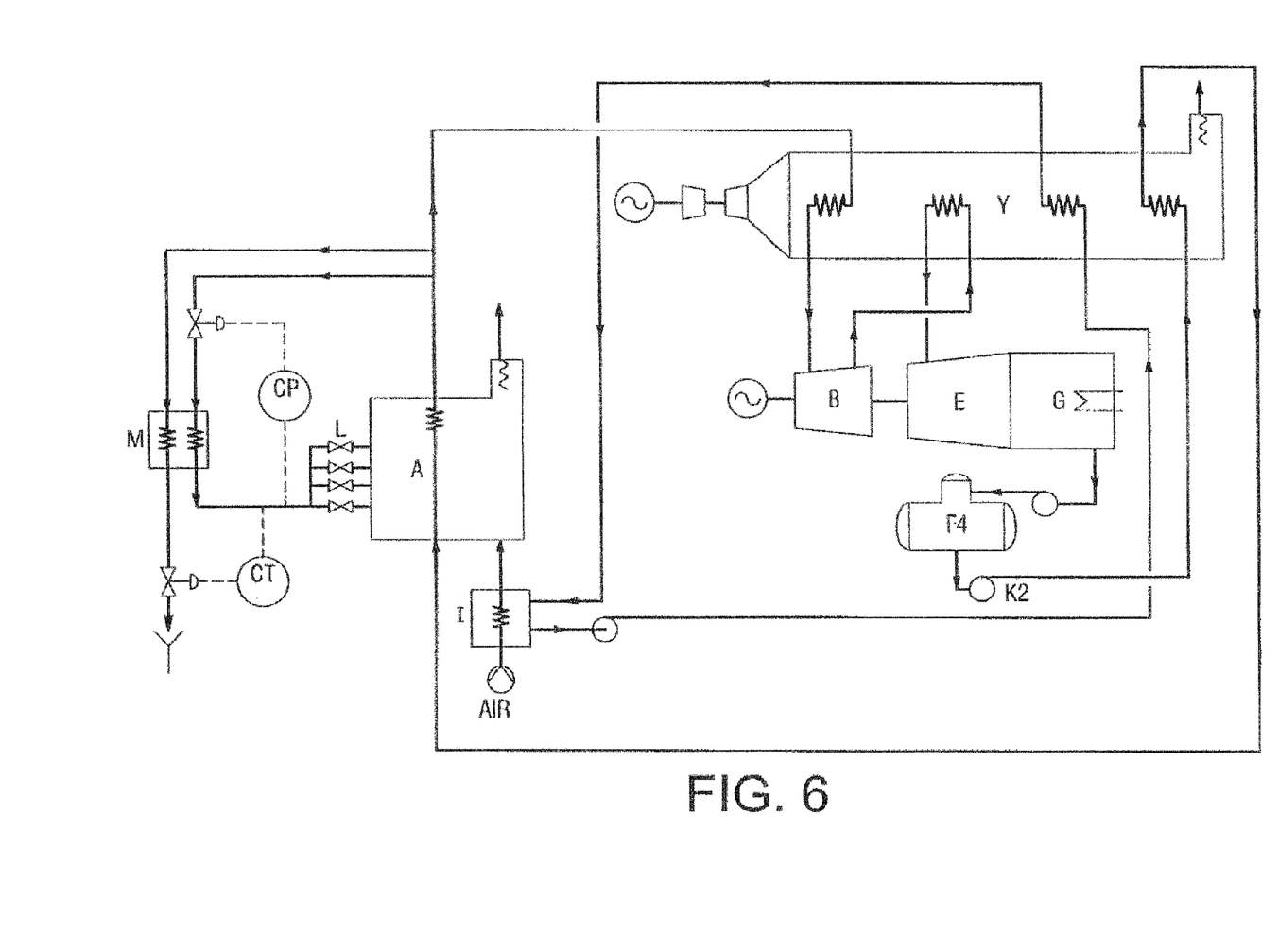
FIG. 6 shows a schematic diagram of the method of the invention for a thermal cycle of high pressure and low temperature steam with reheating in the exterior of the waste boiler.

Finally, FIG. 6 shows a thermal cycle of high pressure and low temperature steam with reheating in the exterior of the waste boiler. Said FIG. 6 depicts a preferred embodiment for electric generation by means of a combustion boiler for urban waste or a product assimilable thereto, which boiler (A) produces high pressure and low temperature steam with external superheating with the exhaust gases of a gas turbine in a boiler (Y). The steam at about 100 bar and 560° C. is expanded in the first body of the turbine (B) and is reheated again in the boiler (Y) at about 560° C., after which it is led to the low pressure body of the steam turbine (E).

The outlet condensate of the condenser (G) is deaerated in (F4) and impelled by the high pressure pump (K2) to the steam boiler (A), being previously heated with the exhaust gases of the gas turbine in the boiler (Y).

Although it is shown in FIG. 6, the high pressure pump (K2) is directly coupled to the shaft of the turbine. The combustion air is heated in the exchanger (I) with boiler water which takes heat from the exhaust gases of the turbine in the boiler (Y).

This embodiment also incorporates the device for removing soot (L) described in step d), depicted in FIG. 7. In order to not complicate the figure, the regenerative water heater and turbine extraction system, which is also used for the combustion air in FIG. 6, is not included.

The incorporation of the inventive concepts in this preferred embodiment allows achieving increases of 3 to 4% in the net production of electric energy, with respect to a similar cycle with superheating of the high pressure steam generated in the waste boiler by means of the exhaust gases of a gas turbine. This advantage is due to the higher net power available as a result of the improvement in the energy efficiency of the process.

In view of this description and set of drawings, the person skilled in the art will understand that the embodiments of the invention which have been described can be combined in many ways within the object of the invention. The invention has been described according to several preferred embodiments thereof, but for the person skilled in the art it will be evident that many variations can be introduced in said preferred embodiments without exceeding the object of the claimed invention.

The invention claimed is:

1. Method for generating energy using thermal cycles with high pressure and moderate temperature steam, the method comprising the steps of:
   a) generating superheated steam at a pressure above 65 bar and a moderate temperature below 400° C. in a waste boiler, the waste boiler comprising waste or biomass as an energy source,
   b) expanding the superheated steam generated in step a) directly in at least one two-body steam turbine comprising a high pressure body and a low pressure body, steam of an intermediate pressure, comprised between 10-40 bar, with a moderate moisture, below 15%, being obtained in said high pressure body,
   c) drying the steam obtained in step b) using at least one moisture separator and reheating said steam with a hot fluid different from steam, whereas the hot liquid water, collected in the moisture separator, is used to supply heat to fluids of the process with a lower thermal level,
   d) expanding the steam obtained in step c) in the low pressure body of said at least one turbine, and
   e) heating boiler water used to generate the steam in step a) using a plurality of steam extractions from said at least one turbine in order to exchange heat with said boiler water.

2. Method for generating energy using thermal cycles with high pressure and moderate temperature steam according to claim 1, wherein the steam obtained in step b) has a pressure comprised between 15-30 bar and a moisture below 5%, and in step e) the boiler water is heated using at least 4 steam extractions from said at least one turbine.

3. Method for generating energy using thermal cycles with high pressure and moderate temperature steam according to claim 1, wherein step e) further comprises using at least one pump for impelling the boiler water, said pump being coupled to a shaft of said at least one steam turbine.

4. Method for generating energy using thermal cycles with high pressure and moderate temperature steam according to claim 1, wherein the generation of steam in step a) and the reheating of dry steam in step c) comprises using heat obtainable from combustion gases of matter selected from waste, biomasses, and a mixture thereof.

5. Method for generating energy using thermal cycles with high pressure and moderate temperature steam according to claim 4, wherein step c) further comprises using air in the combustion of the matter selected from waste, biomasses, and a mixture thereof, wherein said air is preheated using boiler feedwater and water extracted from said at least one moisture separator used in said step c).

6. Method for generating energy using thermal cycles with high pressure and moderate temperature steam according to claim 4, wherein the combustion of matter selected from waste, biomasses, and a mixture thereof is performed in at least one furnace in the cleaning of which superheated steam is used, obtained using the following steps:
   f) taking part of the steam generated in step a) and reducing its pressure, using at least one reducing valve, to a sufficient pressure level for overcoming pressure drops of a system comprising a plurality of soot blowers, and
   g) heating the steam obtained in step f) in at least one heat exchanger, in which a heating fluid is part of the steam generated in step a), superheated steam configured to operate the soot blowers being obtained.

7. Method for generating energy using thermal cycles with high pressure and moderate temperature steam according to claim 1, wherein the generation of steam in step a) and the reheating of dry steam in step c) comprises using heat of a solar origin.

8. Method for generating energy using thermal cycles with high pressure and moderate temperature steam according to claim 1, additionally comprising the following steps:
   h) superheating the steam generated in step a) using heat from the combustion of an auxiliary fuel to a high temperature comprised between 500-580° C., prior to step b), and
   i) performing the reheating of step c) using reheating the steam obtained in step b) using heat from the combustion of said auxiliary fuel at a high temperature comprised between 500-580° C.

9. Method for generating energy using thermal cycles with high pressure and moderate temperature steam according to claim 8, wherein the auxiliary fuel is matter selected from biomass, biogas, natural gas, synthesis gas, waste, waste processing rejects, petroleum-derived fuels, and a mixture thereof.

* * * * *